United States Patent [19]

Stovall

[11] 4,413,415
[45] Nov. 8, 1983

[54] SHAFT ALIGNMENT TOOL

[76] Inventor: David T. Stovall, 265 Theobold La., Sacramento, Calif. 89511

[21] Appl. No.: 342,796

[22] Filed: Jan. 26, 1982

[51] Int. Cl.$^3$ .............................................. G01B 3/30
[52] U.S. Cl. .................................... 33/181 R; 33/412; 269/43; 269/902
[58] Field of Search .......................... 269/43, 45, 902; 29/271, 272; 33/412, 180 R, 21 C, 181 R; 24/243 E, 277

[56] References Cited

U.S. PATENT DOCUMENTS

| | | | |
|---|---|---|---|
| 1,670,253 | 5/1928 | Gilbert et al. | 269/45 |
| 1,739,904 | 12/1929 | Kingston | 24/243 E |
| 1,991,117 | 2/1935 | Porteous et al. | 33/21 C |
| 2,636,273 | 4/1953 | Morris | 33/21 C |
| 2,656,607 | 10/1953 | Harding | 33/412 |
| 2,726,058 | 12/1955 | Foltz | 33/412 |
| 2,774,134 | 12/1956 | Smith et al. | 269/45 |
| 2,832,152 | 4/1958 | Blackshaw | 33/412 |
| 3,086,767 | 4/1963 | Boser | 269/45 |
| 3,100,346 | 8/1963 | Cannon | 33/21 C |
| 3,238,623 | 3/1966 | Lee | 33/21 C |
| 3,883,128 | 5/1975 | Breese | 269/45 |

FOREIGN PATENT DOCUMENTS 972407  1/1951  France .............................. 33/181 R Primary Examiner—Robert C. Watson
Attorney, Agent, or Firm—Harris Zimmerman; Howard Cohen

[57] ABSTRACT

An apparatus for aligning two rotary shafts includes a pair of jigs, each including a pair of othogonally related bars extending from a common vertex. A pair of threaded shafts extend longitudinally from the distal ends of the bars, and a plate secured to the threaded shafts serves to clamp one of the rotary shafts to the orthogonal bars. An arm extending longitudinally from the vertex of the orthogonal bars includes an indicator member extending therefrom, one of the indicator members being adjustably secured along the length thereof. The jigs are each clamped to one of the rotary shafts, rotated into confronting alignment, and the indicator members of both are precisely aligned. The tools are then rotated 180°; any displacement of the indicator members indicates misalignment of the rotating shafts.

1 Claim, 7 Drawing Figures

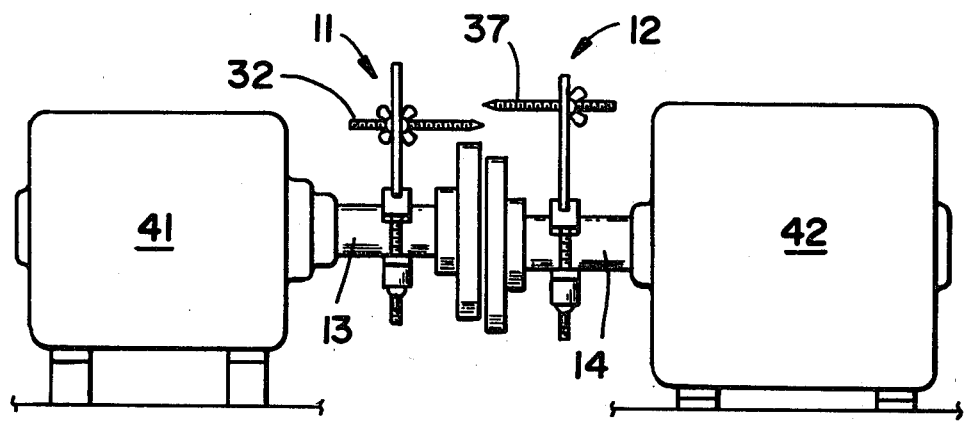
FIG_2
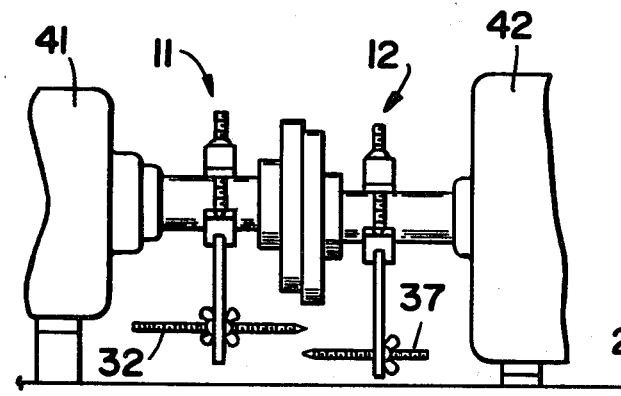
FIG_5
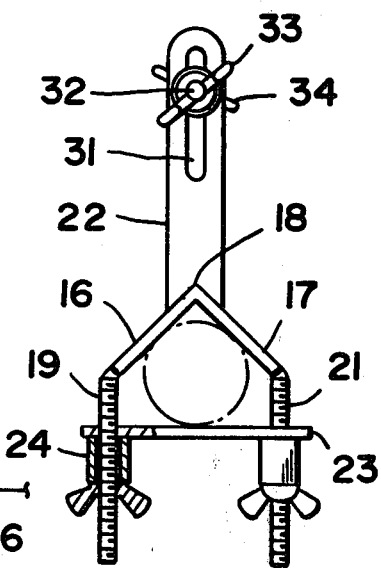
FIG_1
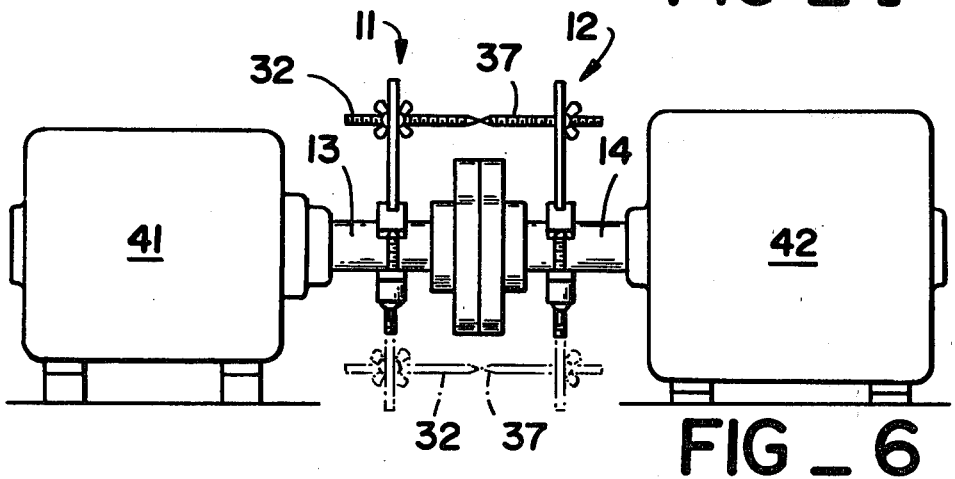
FIG_6

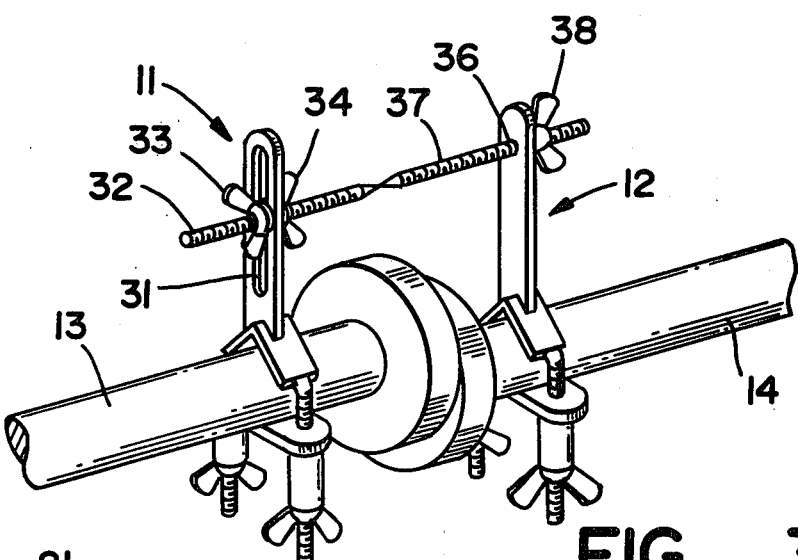
FIG_3
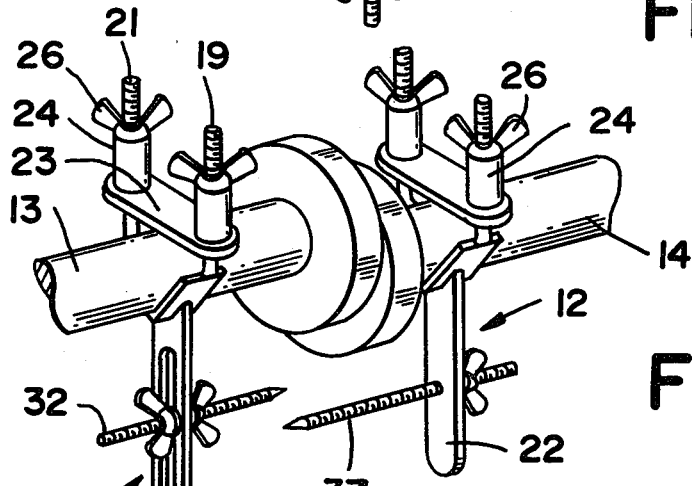
FIG_4
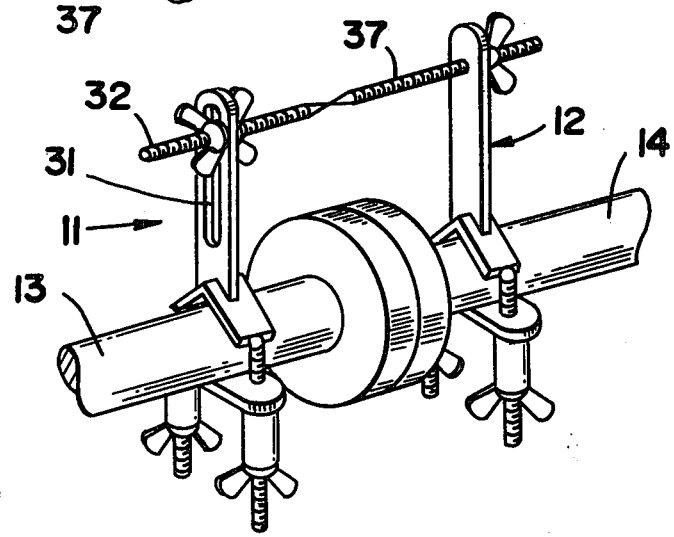
FIG_7

SHAFT ALIGNMENT TOOL

BACKGROUND OF THE INVENTION

The following United States patents comprise the closest known prior art: U.S. Pat. Nos. 600,049; 2,638,676; 2,656,607; 4,161,068; 4,216,587

As shown in the cited patents, it is known in the prior art to provide various devices to facilitate alignment of the rotatable shafts of two rotary machines which are to be coupled together. It is well known that precise alignment of two rotating shafts must be achieved prior to coupling the shafts together. Failure to align precisely the rotating shafts will result in great stresses on the coupling which joins the shafts, as well as extreme wear of the bearings which support the two shafts.

Of the many devices known in the prior art for achieving this purpose, most of them employ some form of clamping device which joins both of the shafts to a common jig in adjustable fashion. Often dial indicators or the like are employed to indicate the misalignment of the shafts with respect to an axis defined by the common jig structure. These devices are recognized to be expensive to manufacture and complicated and time consuming to use.

There is a dearth of shaft alignment devices in the prior art which are inexpensive to manufacture, simple to use, and reliable and accurate in aligning the rotating shafts.

SUMMARY OF THE PRESENT INVENTION

The present invention generally comprises a shaft alignment apparatus which is inexpensive to manufacture, simple to use, and reliable and accurate in aligning rotating shafts of rotary machines.

The apparatus for aligning two rotary shafts includes a pair of jigs, each including a pair of othogonally related bars extending from a common vertex. A pair of threaded shafts extend longitudinally from the distal ends of the bars, and a plate secured to the threaded shafts serves to clamp one of the rotary shafts to the orthogonal bars. An arm extending longitudinally from the vertex of the orthogonal bars includes an indicator member extending therefrom, one of the indicator members being adjustably secured along the length thereof. The jigs are each clamped to one of the rotary shafts, rotated into confronting alignment, and the indicator members of both are precisely aligned. The tools are then rotated 180°; any displacement of the indicator members indicates misalignment of the rotating shafts.

A BRIEF DESCRIPTION OF THE DRAWING

FIG. 1 is a partial cross-sectional end elevation of an adjustable shaft alignment device of the present invention.

FIG. 2 is a side elevation of the alignment apparatus of the present invention, shown in its initial disposition on the rotary shafts to be joined.

FIG. 3 is a perspective view of the apparatus of the present invention, shown with the two indicator members in confronting, aligned relationship.

FIG. 4 is a perspective view of the apparatus of the present invention, shown with the aligned indicators of FIG. 3 rotated 180° about their respective shafts.

FIG. 5 is a side elevation of the apparatus of the present invention, shown in the configuration of FIG. 4.

FIG. 6 is a side elevation of the apparatus of the present invention, shown with the rotating shafts urged into alignment in accordance with the alignment of the indicator members joined thereto.

FIG. 7 is a perspective view of the apparatus of the present invention, shown in the configuration of FIG. 6.

DESCRIPTION OF THE PREFERRED EMBODIMENT

The present invention generally comprises an apparatus for achieving precise axial alignment of two shafts of two separate rotary machines, so that the shafts may be coupled together for rotation in concert. The apparatus comprises a pair of jigs 11 and 12, each adapted to be secured to a respective rotatable shaft 13 or 14. The jigs 11 and 12 are similar but not identical in construction.

With reference to FIGS. 1 and 3, each jig 11 and 12 according to the present invention includes a pair of orthogonally related legs 16 and 17 extending from a common apex 18. The legs are provided with smooth, planar inner surfaces to contact the cylindrical surfaces of the shafts in tangential fashion. Extending longitudinally from the distal ends of the legs 16 and 17 are a pair of threaded shafts 19 and 21, respectively, which are disposed in a common plane. An arm 22 extends longitudinally from the apex 18 of the members 16 and 17, and is likewise disposed in a plane common with the plane of the members 19 and 21, and generally co-linear therewith.

Each of the jigs 11 and 12 also includes a bracket member 23 comprising a laterally extending bar having a pair of holes extending therethrough at opposed ends thereof. The threaded members 19 and 21 are received through the holes in the bracket 23, the bracket being secured thereon in variably spaced relationship by an assembly comprising a collar 24 and a wing nut 26 secured to each of the threaded members. The bracket 23 extends generally transversely with respect to the longitudinal extent of the members 19, 21, and 22. It may be appreciated that each of the jig assemblies is adapted to secure one of the rotary shafts in clamping fashion in the space defined between the legs 16 and 17 and the bracket 23, as shown in phantom line in FIG. 1.

The arm 22 of the jig 11 includes a slot 31 extending longitudinally in the distal end portion thereof. The slot 31 is narrow in width and is provided with closed, rounded opposed ends. Received in the slot 31 is an indicator member 32, comprising a rigid rod extending generally parallel to the shaft which is secured to the jig 11 and including a fine point at one end thereof. The member 32 is provided with external threads extending throughout its entire length. A pair of wing nuts 33 and 34 is secured to the indicator member 32 on opposite sides of the arm 22 to engage compressively the arm 22 and retain the member 32 at any selected position along the slot 31.

The arm 22 of the jig 12 is provided with a tapped hole 36 in the distal end portion thereof to receive an externally threaded indicator member 37 which is substantially identical to the indicator member 32. A wing nut 38 is joined to the indicator member 37 and is provided to impinge compressively upon the surface of the respective arm 22 to immobilize the indicator member 37. A plurality of holes 36 may be provided in the arm 22 of the jig 12 to extend the range of shaft misalignment which may be corrected by the present invention.

The method of employing the apparatus of the present invention involves the initial step of securing both of the jigs 11 and 12 to respective shafts 13 and 14 of respective rotary machines 41 and 42, as shown in FIG. 2. This initial step involves removing the wing nut and collar assemblies 24 and 26, as well as the bracket members 23, to dispose the respective shaft within the legs 16 and 17 of the respective jig. The brackets 23 are then reassembled to the threaded members 19 and 21, and the assemblies 24 and 26 are resecured to the threaded members to cause the brackets 23 to impinge upon the respective shaft clamped therebetween. It may be appreciated that the members 16, 17, and 23 are planar members impinging upon a cylindrical surface, and that the bracket 23 engages the respective shaft in a fashion such that the arms 22 extend generally orthogonally with respect to the axis of the respective shaft. After the jigs are joined to their respective rotatable shafts, the arms 22 of the jigs are brought into parallel, adjacent relationship, so that the indicator members 32 and 37 are disposed with their pointed ends in closely adjacent fashion. Next, the position of the member 32 is adjusted within the slot 31 so that the point thereof is brought into precise alignment with the point of the indicator member 37, as shown in FIG. 3. Member 37 may be threaded into or out of the hole 36 to bring the points of the two indicator members into abutting contact.

After the points of the indicator members are brought into alignment and contact, both of the jigs 11 and 12 are rotated 180' about their respective shafts 13 and 14; alternatively, the shafts themselves may be rotated 180°. As shown in FIG. 4, the 180' rotation of both of the jigs will cause the formerly aligned indicator members to become displaced by a distance which corresponds precisely to the misalignment of the axes of the two shafts in the plane defined by the shaft axis and the zero degree and 180' positions of the jigs. This disposition is also shown in FIG. 5.

It is then a simple task to raise or lower either or both of the rotary machines 41 and 42 to bring the indicator members 32 and 37 into alignment, as shown in phantom line in FIG. 6. When the rotary machines are aligned so that the points of the indicator members are brought into alignment in the 180' position, the shafts are brought into true alignment. The jigs 11 and 12 may then be returned to their initial, or zero degree position to check the accuracy of the alignment. If the points of the indicator members 32 and 37 can be brought into alignment in the zero degree position, as shown in FIG. 7 and in solid line in FIG. 6, the alignment procedure has been carried out accurately, and the shafts are in true alignment.

If the shafts are misaligned in a lateral direction as well as in a vertical direction, it may be necessary to repeat the alignment procedure described in the foregoing, with the initial position of the arms of the two jigs in a lateral disposition; i.e., 90' from vertical. In this situation, after the initial alignment of the indicator members, the two jigs are rotated 180' to the opposite side; i.e., 270° from vertical. The alignment procedure then proceeds as described in the foregoing.

I claim:

1. An apparatus for aligning two rotatable shafts, comprising; a pair of jig assemblies, a pair of clamping means, each associated with one of said jig assemblies for releasably engaging one of the shafts, each clamping means including a pair of leg members extending generally linearly from a common vertex, and adapted to impinge tangentially on one of the shafts disposed therebetween, a pair of bracket members, means for joining each of said bracket members to one of said clamping means in releasable and adjustable fashion, including a pair of threaded shafts extending from the distal ends of said leg members to the respective bracket member, a pair of arms, each extending outwardly from one of said common vertices of one of said clamping means, each arm including a slot extending longitudinally therein, a pair of indicator members, each comprising a rod-like member having an axis extending generally parallel to the respective shaft, each indicator member including a portion extending through one of said slots and secured therein in longitudinally translatable fashion, means for aligning said indicator members in axial registration, said last mentioned means including a tapered, pointed end formed integrally on each of said indicator members and disposed in confronting relationship to the other, like pointed end.

* * * * *